US011115516B1

(12) United States Patent
Pan (10) Patent No.: US 11,115,516 B1
(45) Date of Patent: Sep. 7, 2021

(54) SUPPORT DEVICE

(71) Applicant: SHENZHEN ZHIDAWEI TECHNOLOGY CO., LTD, Shenzhen (CN)

(72) Inventor: Zhi Pan, Shenzhen (CN)

(73) Assignee: SHFNZHEN ZHIDAWEI TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 16/935,228

(22) Filed: Jul. 22, 2020

Related U.S. Application Data

(63) Continuation of application No. PCT/CN2020/097764, filed on Jun. 23, 2020.

(51) Int. Cl.
| | | |
|---|---|---|
| *A47G 1/10* | (2006.01) | |
| *H04M 1/04* | (2006.01) | |
| *F16M 13/02* | (2006.01) | |
| *F16M 13/00* | (2006.01) | |
| *G06F 1/16* | (2006.01) | |

(52) U.S. Cl.
CPC ............ *H04M 1/04* (2013.01); *F16M 13/005* (2013.01); *F16M 13/022* (2013.01); *G06F 1/1626* (2013.01)

(58) Field of Classification Search
CPC ............ H04M 1/04; H04M 1/12; H04M 1/23; F16M 13/005; F16M 13/022; F16M 11/10; G06F 1/1626
USPC ....... 248/229.1, 229.2, 226.11, 274.1, 309.1, 248/316.1; 455/575.1
See application file for complete search history.

(56) References Cited

U.S. PATENT DOCUMENTS

| | | | | |
|---|---|---|---|---|
| 9,845,058 B2* | 12/2017 | Chow | .................. | F16M 13/00 |
| 10,502,247 B2* | 12/2019 | Bury | .................. | F16M 13/022 |
| 10,793,080 B2* | 10/2020 | Zhang | .................. | B60R 11/02 |
| 11,034,309 B2* | 6/2021 | Chow | .................. | F16M 11/14 |

FOREIGN PATENT DOCUMENTS

| | | |
|---|---|---|
| CN | 107770337 A | 3/2018 |
| CN | 108347508 A | 7/2018 |
| CN | 108692149 A | 10/2018 |

(Continued)

OTHER PUBLICATIONS

International Search Report issued in corresponding International application No. PCT/CN2020/097764, dated Mar. 26, 2021(5 pages).

(Continued)

*Primary Examiner* — Todd M Epps (57) ABSTRACT

The present disclosure relates to a technical field of supports, and in particular to a support device. The support device includes a mounting frame and a clamping base, the mounting frame includes a main frame body and a joint structure. Electronic products are installed on the front side of the main frame body, the joint structure joint is connected with a rear side of the main frame body, and the joint structure and the clamping base are detachably connected. Thus, when the electronic product need to be used, the electronic products are detached along with the mounting frame from the clamping base, and there is no need to detach the electronic products from the support device, which simple in operation and convenient in use.

14 Claims, 4 Drawing Sheets

(56) References Cited

FOREIGN PATENT DOCUMENTS

| | | |
|---|---|---|
| CN | 208227100 U | 12/2018 |
| CN | 208798020 U | 4/2019 |
| CN | 209545661 U | 10/2019 |

OTHER PUBLICATIONS

Written Opinion of the International Searching Authority for No. PCT/CN2020/097764.

* cited by examiner

SUPPORT DEVICE

CROSS REFERENCE TO RELATED APPLICATIONS

The present application is a continuation-application of International (PCT) Patent Application No. PCT/CN2020/097764, titled: SUPPORT DEVICE, filed on Jun. 23, 2020, and the entire contents of which is hereby incorporated by reference.

TECHNICAL FIELD

The present disclosure relates to a technical field of supports, and in particular to a support device.

BACKGROUND

With rapid development of science and technology, brands and functions of electronic products are diversified, so that support devices are produced for use and conveniently carrying. At present, there are more and more types of support devices on markets. When the present support devices are in use, there is a defect that the electronic products cannot be removed quickly, which is that, the support devices need to be detached to make the electronic products remove from the support devices, or the present support devices need more force to remove the electronic products, which is inconvenient to use.

SUMMARY

The present disclosure provides a support device to solve technical problems that when the present support devices are in use, there is a defect that the electronic products cannot be removed quickly.

In order to achieve the object, technical solutions of the present disclosure are as follows.

The present disclosure provides a support device, including a mounting frame and a clamping base. The mounting frame includes a main frame body and a joint structure, electronic products are installed on a front side of the main frame body, and the joint structure is connected with a rear side of the main frame body. The joint structure is detachably connected with the clamping base. When the joint structure is detachably connected with the the clamping base, the joint structure adjusts positions relative to the clamping base and is fixedly clamped.

Furthermore, the clamping base includes a main base body. The main base body includes a transfer cavity, a plug-in interface, and a transfer interface. The plug-in interface and the transfer interface are communicated with the transfer cavity, and the plug-in interface is communicated with the transfer interface. The joint structure includes a boss and a limiting component. One end of the boss is connected with a rear side surface of the main frame body, and another end of the boss extends towards a position distal to the main frame body. One end of the limiting component is connected with the boss. An outer contour of a cross section of the boss is a long-strip oval. Two planes facing oppositely and two arcuate surfaces facing oppositely are disposed on an outer side of the boss. When the joint structure is disposed on the main base body, any one of the the arcuate surfaces of the boss directly faces the plug-in interface and is laterally inserted into the transfer interface through the plug-in interface. At this moment, another end of the limiting component is located in the transfer cavity and clamped into the transfer interface. When the joint structure is disposed on the main base body, the joint structure rotates relative to the main base body so that the plug-in interface faces any one of the planes.

Furthermore, the main base body further includes a sliding connection channel and a sliding interface. The sliding interface is communicated with the transfer interface, and the sliding interface and the transfer interface are located on a front side of the main base body. The sliding connection channel is communicated with the transfer cavity, and an opening, distal to the transfer cavity, of the sliding connection channel is the plug-in interface. The plug-in interface is communicated with the sliding interface. When the joint structure is inserted into the main base body, any one of the arcuate surfaces of the boss directly faces the plug-in interface and is laterally inserted into the sliding interface through the plug-in interface. At this moment, a limiting end of the limiting component is located at the sliding connection channel and is clamped into the sliding interface.

Furthermore, the limiting component includes a limiting plate and at least two clamping pins, one end of each of the clamping pins is connected with a plate surface of the limiting plate, and each of the clamping pins is circumferentially evenly distributed around a centerline of the limiting plate. A clamping hole is formed on the mounting frame, and the clamping hole extends from an end surface of the boss to a front side surface of the main frame body. The mounting frame further includes a clamping ring, the clamping ring is circumferentially disposed on a hole wall of the clamping hole, and each of the clamping pins is inserted into the clamping ring through the clamping hole of the boss and is clamping in the clamping ring.

Furthermore, the mounting frame further includes an embedding component, and a front-and-back penetrating embedding hole is disposed on the embedding component. The embedding component is embedded in the mounting frame, and a centerline of the clamping hole is also a centerline of the embedding hole.

Furthermore, the embedding component includes an embedding table having the embedding hole and an embedding plate diverging from a peripheral side wall of the embedding table. The embedded plate has at least one step and is embedded inside the main frame body, and the embedding table is embedded in the boss.

Furthermore, the embedding component further includes an embedding ring, the embedding ring is connected with a front end of the embedding table. The embedding ring extends towards the clamping hole, and the embedding ring is the clamping ring.

Furthermore, the limiting component further includes a positioning protrusion, the positioning protrusion is connected with a plate surface of the limiting plate, and the plate surface of the limiting plate is opposite to each of the clamping pins. The clamping base further includes a positioning table, the positioning table is fixed to a cavity wall of the transfer cavity, the cavity wall faces the transfer interface, and a positioning groove is disposed on the positioning table. When the joint structure is disposed on the main base body, the positioning protrusion is inserted into the positioning groove.

Furthermore, a surface facing the plug-in interface, of the positioning table, is a guide inclined surface, and the guide inclined surface is inclined towards a mounting direction of the joint structure.

Furthermore, the joint structure further includes an annular limiting table and a plurality of strip-shaped limiting teeth. One end of the annular limiting table is connected with the rear side surface of the main frame body, and another end of the annular limiting table extends towards the position distal to the main frame body. The plurality of the strip-shaped limiting teeth is connected with a rear table surface of the annular limiting table. The annular limiting table is sleeved on a periphery of the boss, and a height of the annular limiting table is smaller than a height of the boss. Extension lines of each of the strip-shaped limiting teeth intersect a centerline of the boss, and the extension lines of each of the strip-shaped limiting teeth are circumferentially spaced and are evenly disposed around the centerline of the boss. The clamping base further includes a plurality of strip-shaped clamping teeth, the plurality of the strip-shaped clamping teeth are connected with a front side surface of the main base body. Extension lines of each of the strip-shaped clamping teeth intersect a centerline of the transfer interface, and the extension lines of each of the strip-shaped clamping teeth are circumferentially spaced and are evenly disposed around the centerline of the transfer interface. When the joint structure is disposed on the clamping base, each of the strip-shaped limiting teeth is respectively inserted between any two adjacent strip-shaped clamping teeth.

Furthermore, the clamping base further includes a guide bump, and the guide bump is connected with the front side surface of the main base body. The joint structure further includes a spacer ring. One end of the spacer ring is connected with the rear side surface of the main frame body, and another end of the spacer ring extends towards the position distal to the main frame body. The spacer ring is sleeved on a periphery of the annular limiting table. An inner side wall of the spacer ring, an outer side wall of the annular limiting table, and a surface, between the inner side wall of the spacer ring and the outer side wall of the annular limiting table, of the a rear side surface of the main frame body form an annular guide groove. The centerline of the boss is also a centerline of the annular guide groove. A notch formed on a position, facing any one of the the arcuate surfaces, of the spacer ring. When the joint structure is disposed on the clamping base, the guide pump penetrates through the notch and is inserted into the annular guide groove, and the guide pump directionally slides in the annular guide groove.

Furthermore, the joint structure further includes a plurality of stabilizing teeth, the plurality stabilizing teeth are connected with the rear side surface of the main frame body. Extension lines of each of the stabilizing teeth intersect the centerline of the boss, and the extension lines of each of the stabilizing teeth are circumferentially spaced and are evenly disposed around the centerline of the boss. The guide pump is inserted between any two adjacent stabilizing teeth.

Furthermore, the mounting frame further includes a packaging sheet, a packaging groove is formed on the front side surface of the main frame body and on a peripheral side of a hole opening of the clamping hole. The packaging sheet is adapted to the packaging groove and fixed to the packaging groove.

Furthermore, the clamping base includes two hanging lugs, and the two hanging lugs respectively connected with two opposite sides of the main base body. A hanging hole is formed on each of the hanging lugs so that a strap penetrates the hanging hole.

Furthermore, the clamping base further includes a semi-fixing sleeve and a fastening strip. The semi-fixing sleeve is fixedly connected with a rear side of the main base body, and one end of the fastening strip is connected with one end of the semi-fixing sleeve. And another end of the fastening strip is detachably connected with another end of the semi-fixing sleeve.

The support device includes the mounting frame and the clamping base, the mounting frame includes the main frame body and the joint structure. The electronic products are installed on the front side of the main frame body, the joint structure joint is connected with the rear side of the main frame body, and the joint structure and the clamping base are detachably connected. Thus, when the electronic product need to be used, the electronic products are detached along with the mounting frame from the clamping base, and there is no need to detach the electronic products from the support device, which simple in operation and convenient in use. Moreover, the joint structure adjusts positions and is fixedly clamped corresponding to the clamping base, which realizes adjustability of the mounting frame, to better ensure stability when the mounting frame and the clamping base are assembled together and further improves users' experience.

BRIEF DESCRIPTION OF DRAWINGS

In order to more clearly illustrate the technical solutions of embodiments of the present disclosure or the prior art, reference is made to the accompanying drawings, which are to be used in connection with the embodiments or the prior art. In particular, it will be obvious that the drawings in the following description are merely some examples of the present disclosure, and other drawings may be obtained by those skilled in the art without creative efforts according to the structures illustrated in these drawings.

| | | | |
|---|---|---|---|
| Mounting frame | 100 | Clamping base | 200 |
| Main frame body | 110 | Joint structure | 120 |
| Main base body | 210 | Transfer cavity | 201 |
| Plug-in interface | 202 | Transfer interface | 203 |
| Boss | 121 | Limiting component | 122 |
| Plane | 1211 | Arcuate surfaces | 1212 |
| Sliding connection channel | 204 | Sliding interface | 205 |
| Guide surface | 206 | Limiting plate | 1221 |
| Clamping pin | 1222 | Clamping hole | 101 |
| Clamping ring | 133 | Embedding component | 130 |
| Embedding hole | 1301 | Embedding table | 131 |
| Embedding plate | 132 | Limiting pump | 1223 |
| Limiting table | 220 | Limiting groove | 207 |
| Guide inclined surface | 208 | Annular limiting table | 123 |
| Strip-shaped limiting tooth | 124 | Strip-shaped clamping tooth | 230 |
| Spacer ring | 125 | Annular guide groove | 1201 |
| Notch | 1202 | Stabilizing tooth | 126 |
| Packaging sheet | 140 | Packaging groove | 102 |
| Semi-fixing sleeve | 240 | Fastening strip | 250 |

DETAILED DESCRIPTION

In order to make the objectives, technical solutions and advantages of the present disclosure clearer, the present disclosure is further described in details below with reference to the accompanying drawings and embodiments. It should be understood that the specific embodiments described herein are only used to explain the present disclosure and are not intended to limit the present disclosure.

It should be noted that when an element is referred to as being "fixed to" or "disposed" on another element, it may be directly on another element or it may be indirectly fixed to or disposed on another element through a third component. When an element is said to be "connected with" another element, it may be directly connected with another element or it may be indirectly connected with another element through a third component.

It should be understood that the terms "length", "width", "upper", "lower", "front", "rear", "left", "right", "vertical", "horizontal", "top", "bottom", "inner", "outer" and other indications are based on the orientation or positional relationship shown in the drawings, only to facilitate the description of the present disclosure and simplify the descriptions, not to indicate or imply the device or the element must have a specific orientation, be constructed and operated in a specific orientation, and therefore cannot be understood as a limitation of the present disclosure.

Figure 1:
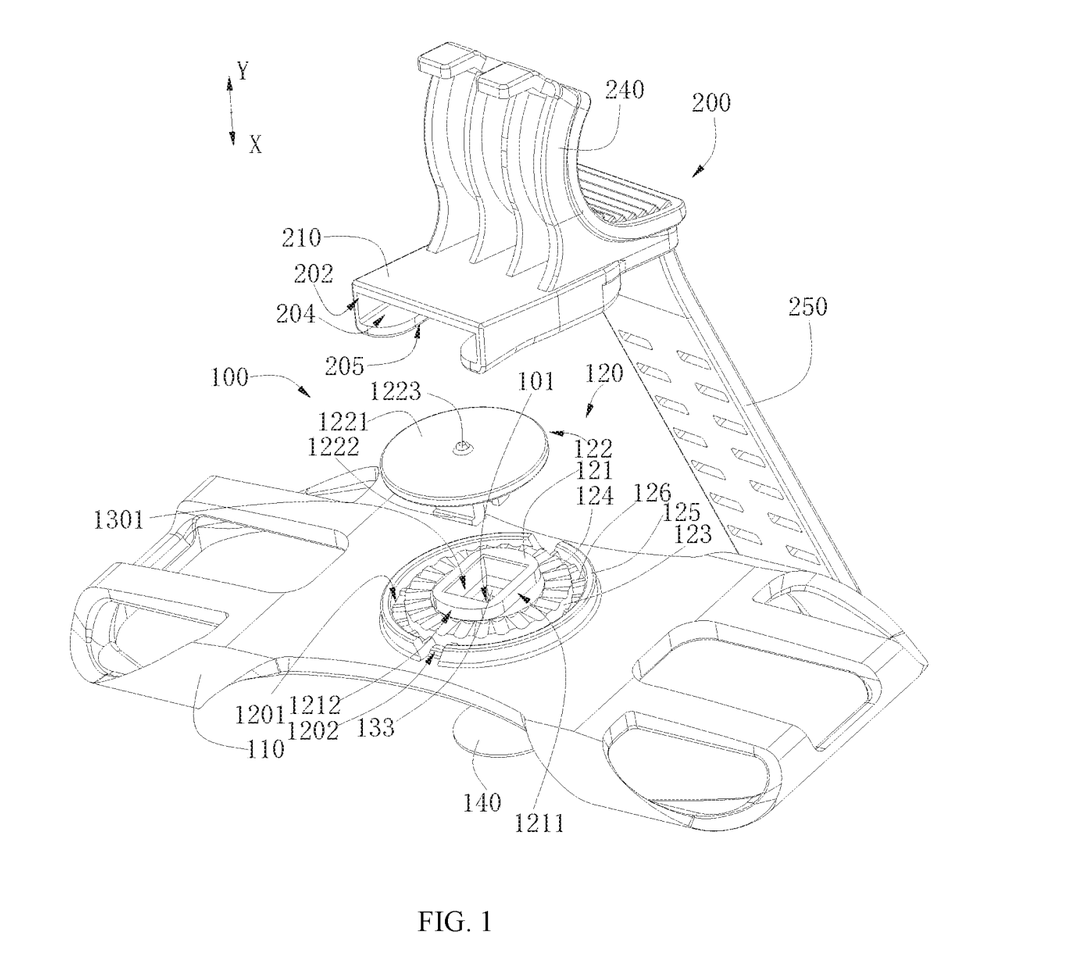
FIG. 1 is an exploded perspective diagram of a support device of one embodiment of the present disclosure.

Please refer to FIG. 1, X indicates a direction of a front side, and Y is an opposite direction of the X, which indicates a direction of a rear side.

In addition, the terms "first" and "second" are used for description purposes only, and cannot be understood as indicating or implying relative importance or implicitly indicating the number of technical features indicated. Thus, the features defined as "first" and "second" may explicitly or implicitly include one or more of the features. In the description of the present disclosure, the meaning of "plurality" is two or more, unless otherwise specifically limited.

Figure 2:
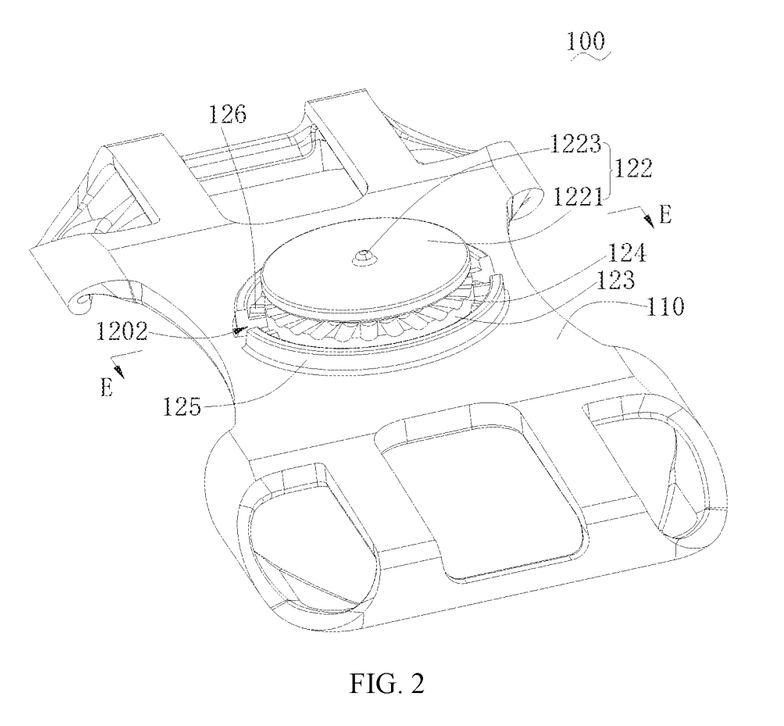
FIG. 2 is a perspective diagram of a mounting frame of one embodiment of the present disclosure.

Please refer to FIGS. 1-2, the present disclosure provides a support device, including a mounting frame 100 and a clamping base 200. The mounting frame 100 includes a main frame body 110 and a joint structure 120, electronic products are installed on a front side of the main frame body 110. The electronic products may be different brands, different models of mobile phones, I pads, etc. The main frame body 110 may be a specific mounting frame 100 for installing the electronic products, or may be a housing that protects electronic products. The joint structure 120 is connected with a rear side of the main frame body 110. The joint structure 120 is detachably connected with the clamping base 200. When the joint structure 120 is detachably connected with the the clamping base 200, the joint structure 120 adjusts positions relative to the clamping base 200 and is fixedly clamped.

In one embodiment, the support device includes the mounting frame 100 and the clamping base 200, the mounting frame 100 includes the main frame body 110 and the joint structure 120. The electronic products are installed on the front side of the main frame body 110, the joint structure joint is connected with the rear side of the main frame body 110, and the joint structure 120 and the clamping base 200 are detachably connected. Thus, when the electronic product need to be used, the electronic products are detached along with the mounting frame 100 from the clamping base 200, and there is no need to detach the electronic products from the support device, which simple in operation and convenient in use. Moreover, the joint structure 120 adjusts positions relative to the clamping base 200 and is fixedly clamped, which realizes adjustability of the mounting frame 100, to better ensure stability when the mounting frame 100 and the clamping base 200 are assembled together and further improves users' experience.

Figure 3:
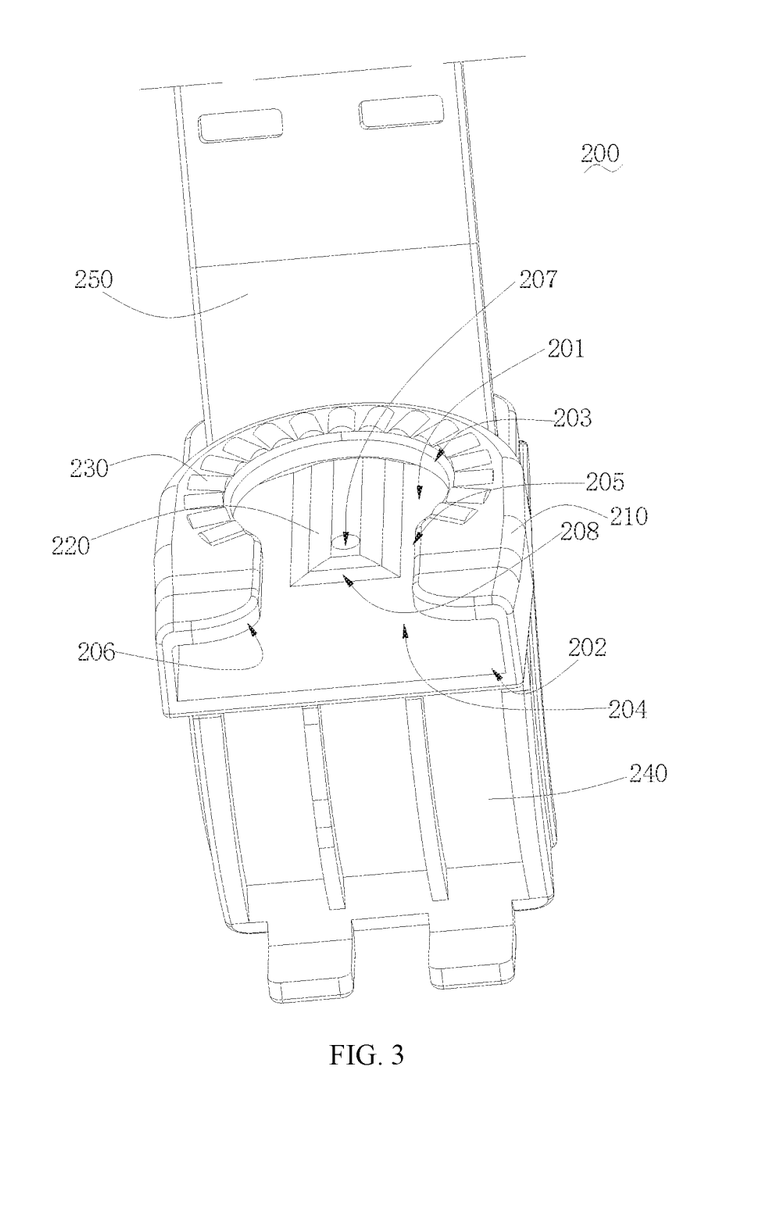
FIG. 3 is a perspective diagram of a clamping base of one embodiment of the present disclosure.

Please refer to FIGS. 1-3, the clamping base 200 includes a main base body 210. The main base body 210 includes a transfer cavity 201, a plug-in interface 202, and a transfer interface 203. The plug-in interface 202 and the transfer interface 203 are communicated with the transfer cavity 201, and the plug-in interface 202 is communicated with the transfer interface 203. The transfer interface 203 is disposed on a front side of the main base body 210.

The joint structure 120 includes a boss 121 and a limiting component 122. One end of the boss 121 is connected with a rear side surface of the main frame body 110, and another end of the boss 121 extends towards a position distal to the main frame body 110. One end of the limiting component 122 is connected with the boss 121. An outer contour of a cross section of the boss 121 is a long-strip oval. Two planes 1211 facing oppositely and two arcuate surfaces 1212 facing oppositely are disposed on an outer side of the boss.

When the joint structure 120 is disposed on the main base body 210, any one of the the arcuate surfaces 1212 of the boss 121 directly faces the plug-in interface 202 and is laterally inserted into the transfer interface 203 through the plug-in interface 202. At this moment, another end of the limiting component 122 is located in the transfer cavity 201 and clamped into the transfer interface 203. When the joint structure 120 is disposed on the main base body 210, the joint structure 120 rotates relative to the main base body 210 so that the plug-in interface 202 faces any one of the planes 1211.

In one embodiment, the plug interface 202 is just for the boss 121 to insert along a length direction. Thus, when the joint structure 120 is disposed on the main base body 210, the joint structure 120 rotates relative to the main base body 210 so that the plug-in interface 202 faces any one of the planes 1211. Thus, the boss 121 is effectively avoided from sliding out the plug-in interface 202 and plays a limiting role for the joint structure 120.

In one embodiment, the centerline of the boss 121 is a rotation axis of the boss 121, and is also an axis of the transfer interface 203.

Please refer to FIGS. 1-3, the main base body 210 further includes a sliding connection channel 204 and a sliding interface 205. The sliding interface 205 is communicated with the transfer interface 203, and the sliding interface 205 and the transfer interface 203 are located on a front side of the main base body 210. The sliding connection channel 204 is communicated with the transfer cavity 201, and an opening, distal to the transfer cavity 201, of the sliding connection channel 204 is the plug-in interface 202. The plug-in interface 202 is communicated with the sliding interface 205.

When the joint structure 120 is inserted into the main body 210, any one of the arcuate surfaces 1212 of the boss 121 directly faces the plug-in interface 202 and is laterally inserted into the sliding interface 205 through the plug-in interface 202. At this moment, a limiting end of the limiting component 122 is located at the sliding connection channel 204 and is clamped into the sliding interface 205.

In one embodiment, when the sliding connection channel is disposed, stability of an installation process between the mounting frame 100 and the clamping base 200 is effectively improved.

Please refer to FIG. 3, the main base body 210 includes a guide surface 206, the guide surface is disposed on a position distal to the transfer cavity 201, inside the sliding interface 205. The guide surface may be a guide inclined surface and may also be a guide arc surface. Then positioning and installing of the joint structure 120 is realized, and assembly efficiency of the joint structure 120 improved.

Figure 4:
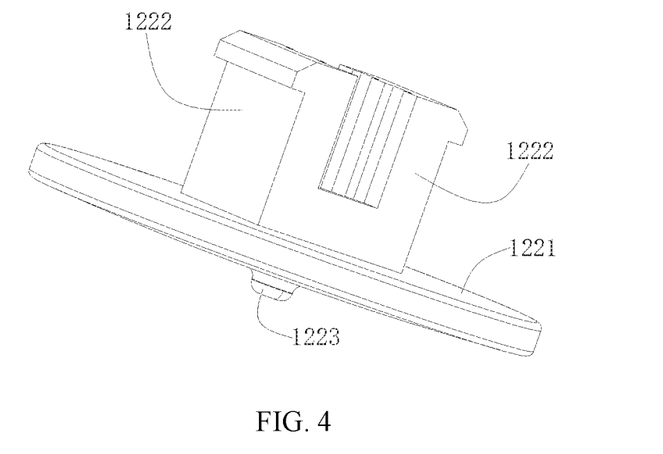
FIG. 4 is a perspective diagram of a limiting component of one embodiment of the present disclosure.

Please refer to FIGS. 1 and 3-4, the limiting component 122 includes a limiting plate 1221 and at least two clamping pins 1222, one end of each of the clamping pins 1222 is connected with a plate surface of the limiting plate 1221, and each of the clamping pins 1222 is circumferentially evenly distributed around a centerline of the limiting plate 1221.

A clamping hole 101 is formed on the mounting frame 100, and the clamping hole 101 extends from an end surface of the boss 121 to a front side surface of the main frame body 110.

The mounting frame 100 further includes a clamping ring 133, the clamping ring 133 is circumferentially disposed on a hole wall of the clamping hole 101, and each of the clamping pins 1222 is inserted into the clamping ring 133 through the clamping hole 101 of the boss 121 and is clamping in the clamping ring 133.

In one embodiment, when the limiting component 122 needs to be installed on the boss 121, each of the clamping pins 1222 is inserted into the clamping hole 101 and is pushed ahead along the hole wall. At this moment, each of the clamping pins 1222 is acted upon by a counteracting force of the hole wall and is elastically folded. When a clamping end of each of the clamping pins 1222 extends out of the clamping ring 133, each of the clamping pins 1222 elastically expands and clamps in a front side end surface of the clamping ring 133 under an action of each of the clamping pins 1222's own elastic restoring force. When the limiting component 122 needs to be removed from the boss 121, only a certain external force needs to be applied to fold each of the clamping pins 1222 so that each of the clamping pins 1222 is separated from the clamping ring 133. In this way, a detachable connection between the limiting component 122 and the mounting frame 100 is realized without any fastener assistance, which is simply in structure, and quick and convenient in operations.

Figure 5:
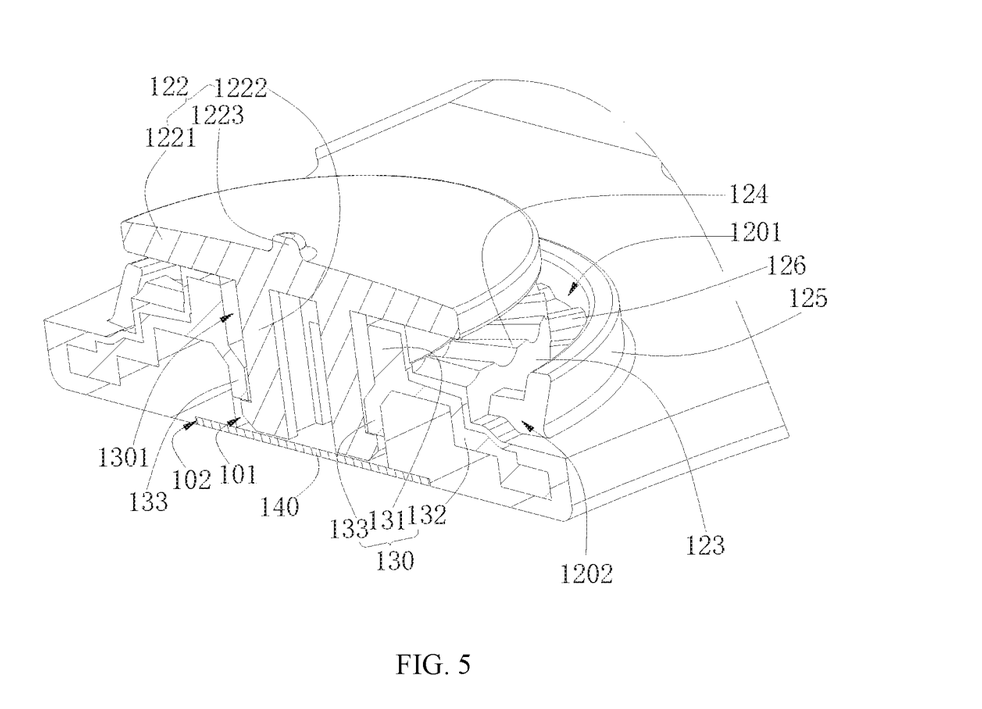
FIG. 5 is a cross-sectional perspective diagram along with line E-E of FIG. 2.

Please refer to FIGS. 1 and 5, the mounting frame 100 further includes an embedding component 130, and a front-and-back penetrating embedding hole 1301 is disposed on the embedding component 130. The embedding component 130 is embedded in the mounting frame 100, and a centerline of the clamping hole is also a centerline of the embedding hole. In this way, strength of a joint of the mounting frame 100 and the clamping base 200 is effectively improved.

In one embodiment, both the main frame body 110 and the joint structure 120 are plastic components. The embedding component 130 may be a metal component and may also be a plastic component. But hardness of the embedding component 130 is higher than the main frame body 110 and the joint structure 120.

In one embodiment, when the mounting frame 100 is injection molded, the embedding component 130 and the mounting frame 100 are injection molded together.

Please refer to FIGS. 1 and 5, the embedding component 130 includes an embedding table 131 having the embedding hole 1301 and an embedding plate 132 diverging from a peripheral side wall of the embedding table 131. The embedded plate 132 has at least one step and is embedded inside the main frame body 110, and the embedding table 131 is embedded in the boss 121.

Please refer to FIGS. 1 and 5, the embedding component 130 further includes an embedding ring, the embedding ring is connected with a front end of the embedding table 131. The embedding ring extends towards the clamping hole 101, and the embedding ring is the clamping ring 133. In the way, installing stability of the limiting component 122 is improved.

Please refer to FIGS. 1 and 3-5, the limiting component 122 further includes a positioning protrusion 1223, the positioning protrusion 1223 is connected with a plate surface of the limiting plate 1221, and the plate surface of the limiting plate 1221 is opposite to each of the clamping pins 1222.

The clamping base 200 further includes a positioning table 220, the positioning table 220 is fixed to a cavity wall of the transfer cavity 201, the cavity wall faces the transfer interface 203, and a positioning groove 207 is disposed on the positioning table 220.

When the joint structure 120 is disposed on the main base body 210, the positioning protrusion 1223 is inserted into the positioning groove 207.

In one embodiment, when the mounting frame 100 is installed in the clamping base 200, the positioning protrusion 1223 of the limiting component 122 is inserted and matched with the positioning groove 207 of the clamping base 200 to install the mounting frame 100 in place, mounting efficiency is improved and a prompting effect is realized.

Please refer to FIG. 3, a surface facing the plug-in interface 202, of the positioning table 220, is a guide inclined surface 208, and the guide inclined surface 208 is inclined towards a mounting direction of the joint structure 120. In this way, the mounting frame is successfully installed in place.

Please refer to FIGS. 1-3, the joint structure 120 further includes an annular limiting table 123 and a plurality of strip-shaped limiting teeth 124. One end of the annular limiting table 123 is connected with the rear side surface of the main frame body 110, and another end of the annular limiting table 123 extends towards the position distal to the main frame body 110. The plurality of the strip-shaped limiting teeth 124 is connected with a rear table surface of the annular limiting table 123. The annular limiting table 123 is sleeved on a periphery of the boss 121, and a height of the annular limiting table 123 is smaller than a height of the boss 121. Extension lines of each of the strip-shaped limiting teeth 124 intersect a centerline of the boss 121, and the extension lines of each of the strip-shaped limiting teeth 124 are circumferentially spaced and are evenly disposed around the centerline of the boss 121.

The clamping base 200 further includes a plurality of strip-shaped clamping teeth 230, the plurality of the strip-shaped clamping teeth 230 are connected with a front side surface of the main base body 210. Extension lines of each of the strip-shaped clamping teeth 230 intersect a centerline of the transfer interface 203, and the extension lines of each of the strip-shaped clamping teeth 230 are circumferentially spaced and are evenly disposed around the centerline of the transfer interface 203.

When the joint structure 120 is disposed on the clamping base 200, each of the strip-shaped limiting teeth 124 is respectively inserted between any two adjacent strip-shaped clamping teeth 230.

In one embodiment, when the joint structure 120 is installed on the clamping base 200 or rotates relative to the clamping base 200 to adjust, each of the strip-shaped limiting teeth 124 of the joint structure 120 is respectively inserted between any two adjacent strip-shaped clamping teeth 230 of the clamping base 200. The joint structure 120 is realized to lock with the clamping base 200, which improve stability of the joint structure 120.

Please refer to FIGS. 1-3 and 5, the clamping base 200 further includes a guide bump (not shown in the drawings), and the guide bump is connected with the front side surface of the main base body 210.

The joint structure 120 further includes a spacer ring 125. One end of the spacer ring 125 is connected with the rear side surface of the main frame body 110, and another end of the spacer ring 125 extends towards the position distal to the main frame body 110. The spacer ring 125 is sleeved on a periphery of the annular limiting table 123. An inner side wall of the spacer ring 125, an outer side wall of the annular limiting table 123, and a surface, between the inner side wall of the spacer ring 125 and the outer side wall of the annular limiting table 123, of the a rear side surface of the main frame body 110 form an annular guide groove 1201. The centerline of the boss 121 is also a centerline of the annular guide groove 1201.

A notch 1201 formed on a position, facing any one of the the arcuate surfaces 1212, of the spacer ring 125.

When the joint structure 120 is disposed on the clamping base 200, the guide pump penetrates through the notch 1202 and is inserted into the annular guide groove 1201, and the guide pump directionally slides in the annular guide groove.

In one embodiment, the guide pump is inserted and matched with the annular guide groove 1201 to ensure the joint structure 120 stably rotate. Meanwhile, the joint structure 120 is better avoided from separating from the clamping base 200.

Please refer to FIGS. 1, 2, and 5, the joint structure 120 further includes a plurality of stabilizing teeth 126, the plurality stabilizing teeth 126 are connected with the rear side surface of the main frame body 110. Extension lines of each of the stabilizing teeth 126 intersect the centerline of the boss 121, and the extension lines of each of the stabilizing teeth 126 are circumferentially spaced and are evenly disposed around the centerline of the boss 121. The guide pump is inserted between any two adjacent stabilizing teeth 126. In this way, firmness between the joint structure 120 and the clamping base 200 is better ensured when the joint structure 120 is locked with the clamping base 200.

Please refer to FIGS. 1 and 5, the mounting frame 100 further includes a packaging sheet 140, a packaging groove 102 is formed on the front side surface of the main frame body 110 and on a peripheral side of a hole opening of the clamping hole 101. The packaging sheet 140 is adapted to the packaging groove 102 and fixed to the packaging groove 102. In this way, not only dust is avoided from entering, but also aesthetic property of an overall appearance is ensured.

Please refer to FIGS. 1 and 3, the clamping base 240 further includes a semi-fixing sleeve 240 and a fastening strip 250. The semi-fixing sleeve 240 is fixedly connected with a rear side of the main base body 210, and one end of the fastening strip 250 is connected with one end of the semi-fixing sleeve 240. And another end of the fastening strip 250 is detachably connected with another end of the semi-fixing sleeve 240.

In one embodiment, the semi-fixing sleeve 240 may be sleeved on a tubular component, a columnar component or a rod component, and an inner contour of the cross section of the semi-fixing sleeve 240 matches a shape of the tubular component, the columnar component or the rod component. Then the semi-fixing sleeve 240 is fixed on the tubular component, the columnar component or the rod component through the fastening strip 250 to fix the clamping base 200.

In one embodiment, tightness is adjusted by the fastening strip 250.

Alternatively, the clamping base 200 includes two hanging lugs, and the two hanging lugs respectively connected with two opposite sides of the main base body 210. A hanging hole is formed on each of the hanging lugs so that a strap penetrates the hanging hole. Then the clamping base 200 is realized to fix on the tubular component, the columnar component or the rod component.

The above disclosure is only the preferred embodiments of the present disclosure, and are not intended to limit the present disclosure. Any modifications, equivalent replacements and improvements made within the spirits and principles of the present disclosure should be included in the protection scopes of the present disclosure.

What is claimed is:

1. A support device, comprising a mounting frame and a clamping base;
   wherein the mounting frame comprises a main frame body and a joint structure, electronic products are installed on a front side of the main frame body, and the joint structure is connected with a rear side of the main frame body;
   the joint structure is detachably connected with the clamping base; when the joint structure is detachably connected with the the clamping base, the joint structure adjusts positions relative to the clamping base and is fixedly clamped;
   the clamping base comprises a main base body: the main base body comprises a transfer cavity, a plug-in interface, and a transfer interface; the plug-in interface and the transfer interface are communicated with the transfer cavity, and the plug-in interface is communicated with the transfer interface;
   the joint structure comprises a boss and a limiting component: one end of the boss is connected with a rear side surface of the main frame body, and another end of the boss extends towards a position distal to the main frame body: one end of the limiting component is connected with the boss; an outer contour of a cross section of the boss is a long-strip oval: two planes facing oppositely and two arcuate surfaces facing oppositely are disposed on an outer side of the boss; and
   when the joint structure is disposed on the main base body, any one of the the arcuate surfaces of the boss directly faces the plug-in interface and is laterally inserted into the transfer interface through the plug-in interface: at this moment, another end of the limiting component is located in the transfer cavity and clamped into the transfer interface: when the joint structure is disposed on the main base body, the joint structure rotates relative to the main base body so that the plug-in interface faces any one of the planes.

2. The support device according to claim 1, wherein the main base body further comprises a sliding connection channel and a sliding interface; the sliding interface is communicated with the transfer interface, and the sliding interface and the transfer interface are located on a front side of the main base body; the sliding connection channel is communicated with the transfer cavity, and an opening, distal to the transfer cavity, of the sliding connection channel is the plug-in interface; the plug-in interface is communicated with the sliding interface; and
   when the joint structure is inserted into the main base body, any one of the arcuate surfaces of the boss directly faces the plug-in interface and is laterally inserted into the sliding interface through the plug-in interface; at this moment, a limiting end of the limiting component is located at the sliding connection channel and is clamped into the sliding interface.

3. The support device according to claim 1, wherein the limiting component comprises a limiting plate and at least two clamping pins, one end of each of the clamping pins is connected with a plate surface of the limiting plate, and each of the clamping pins is circumferentially evenly distributed around a centerline of the limiting plate;

a clamping hole is formed on the mounting frame, and the clamping hole extends from an end surface of the boss to a front side surface of the main frame body; and the mounting frame further comprises a clamping ring, the clamping ring is circumferentially disposed on a hole wall of the clamping hole, and each of the clamping pins is inserted into the clamping ring through the clamping hole of the boss and is clamping in the clamping ring.

4. The support device according to claim 3, wherein the mounting frame further comprises a packaging sheet, a packaging groove is formed on the front side surface of the main frame body and on a peripheral side of a hole opening of the clamping hole; the packaging sheet is adapted to the packaging groove and fixed to the packaging groove.

5. The support device according to claim 3, wherein the mounting frame further comprises an embedding component, and a front-and-back penetrating embedding hole is disposed on the embedding component; the embedding component is embedded in the mounting frame, and a centerline of the clamping hole is also a centerline of the embedding hole.

6. The support device according to claim 5, wherein the embedding component comprises an embedding table having the embedding hole and an embedding plate diverging from a peripheral side wall of the embedding table; the embedded plate has at least one step and is embedded inside the main frame body, and the embedding table is embedded in the boss.

7. The support device according to claim 6, wherein the embedding component further comprises an embedding ring, the embedding ring is connected with a front end of the embedding table; the embedding ring extends towards the clamping hole, and the embedding ring is the clamping ring.

8. The support device according to claim 3, wherein the limiting component further comprises a positioning protrusion, the positioning protrusion is connected with a plate surface of the limiting plate, and the plate surface of the limiting plate is opposite to each of the clamping pins;

the clamping base further comprises a positioning table, the positioning table is fixed to a cavity wall of the transfer cavity, the cavity wall faces the transfer interface, and a positioning groove is disposed on the positioning table; and when the joint structure is disposed on the main base body, the positioning protrusion is inserted into the positioning groove.

9. The support device according to claim 8, wherein a surface facing the plug-in interface, of the positioning table, is a guide inclined surface, and the guide inclined surface is inclined towards a mounting direction of the joint structure.

10. The support device according to claim 1, wherein the joint structure further comprises an annular limiting table and a plurality of strip-shaped limiting teeth; one end of the annular limiting table is connected with the rear side surface of the main frame body, and another end of the annular limiting table extends towards the position distal to the main frame body; the plurality of the strip-shaped limiting teeth is connected with a rear table surface of the annular limiting table; the annular limiting table is sleeved on a periphery of the boss, and a height of the annular limiting table is smaller than a height of the boss; extension lines of each of the strip-shaped limiting teeth intersect a centerline of the boss, and the extension lines of each of the strip-shaped limiting teeth are circumferentially spaced and are evenly disposed around the centerline of the boss;

the clamping base further comprises a plurality of strip-shaped clamping teeth, the plurality of the strip-shaped clamping teeth are connected with a front side surface of the main base body; extension lines of each of the strip-shaped clamping teeth intersect a centerline of the transfer interface, and the extension lines of each of the strip-shaped clamping teeth are circumferentially spaced and are evenly disposed around the centerline of the transfer interface; and when the joint structure is disposed on the clamping base, each of the strip-shaped limiting teeth is respectively inserted between any two adjacent strip-shaped clamping teeth.

11. The support device according to claim 10, wherein the clamping base further comprises a guide bump, and the guide bump is connected with the front side surface of the main base body;

the joint structure further comprises a spacer ring; one end of the spacer ring is connected with the rear side surface of the main frame body, and another end of the spacer ring extends towards the position distal to the main frame body; the spacer ring is sleeved on a periphery of the annular limiting table; an inner side wall of the spacer ring, an outer side wall of the annular limiting table, and a surface, between the inner side wall of the spacer ring and the outer side wall of the annular limiting table, of the a rear side surface of the main frame body form an annular guide groove; the centerline of the boss is also a centerline of the annular guide groove;

a notch formed on a position, facing any one of the the arcuate surfaces, of the spacer ring; and when the joint structure is disposed on the clamping base, the guide pump penetrates through the notch and is inserted into the annular guide groove, and the guide pump directionally slides in the annular guide groove.

12. The support device according to claim 11, wherein the joint structure further comprises a plurality of stabilizing teeth, the plurality stabilizing teeth are connected with the rear side surface of the main frame body; extension lines of each of the stabilizing teeth intersect the centerline of the boss, and the extension lines of each of the stabilizing teeth are circumferentially spaced and are evenly disposed around the centerline of the boss; and the guide pump is inserted between any two adjacent stabilizing teeth.

13. The support device according to claim 1, wherein the clamping base comprises two hanging lugs, and the two hanging lugs respectively connected with two opposite sides of the main base body; a hanging hole is formed on each of the hanging lugs so that a strap penetrates the hanging hole.

14. The support device according to claim 1, wherein the clamping base further comprises a semi-fixing sleeve and a fastening strip; the semi-fixing sleeve is fixedly connected with a rear side of the main base body; one end of the fastening strip is connected with one end of the semi-fixing sleeve; and another end of the fastening strip is detachably connected with another end of the semi-fixing sleeve.

* * * * *